(12) United States Patent
Nielsen et al.

(10) Patent No.: US 7,640,105 B2
(45) Date of Patent: *Dec. 29, 2009

(54) MARKING SYSTEM AND METHOD WITH LOCATION AND/OR TIME TRACKING

(75) Inventors: Steven Nielsen, North Palm Beach, FL (US); Curtis Chambers, Palm Beach Gardens, FL (US); Jeffrey Farr, Jupiter, FL (US); Mark A Conner, Palmetto, FL (US)

(73) Assignee: Certus View Technologies, LLC, Palm Beach Gardens, FL (US)

( * ) Notice: Subject to any disclaimer, the term of this patent is extended or adjusted under 35 U.S.C. 154(b) by 344 days.

This patent is subject to a terminal disclaimer.

(21) Appl. No.: 11/685,602

(22) Filed: Mar. 13, 2007

(65) Prior Publication Data

US 2008/0228294 A1 Sep. 18, 2008

(51) Int. Cl.
*G01C 21/00* (2006.01)
(52) U.S. Cl. .................. 701/213; 342/357.13; 340/988
(58) Field of Classification Search ................ 340/988; 342/357.13; 701/213
See application file for complete search history.

(56) References Cited

U.S. PATENT DOCUMENTS

| | | | |
|---|---|---|---|
| 3,871,557 A | 3/1975 | Smrt | |
| 3,972,038 A | 7/1976 | Fletcher et al. | |
| 3,974,491 A | 8/1976 | Sipe | |
| 4,258,320 A | 3/1981 | Schonstedt | |
| 4,387,340 A | 6/1983 | Peterman | |
| 4,388,592 A | 6/1983 | Schonstedt | |
| 4,520,317 A | 5/1985 | Peterman | |
| 4,536,710 A | 8/1985 | Dunham | |
| 4,539,522 A | 9/1985 | Schonstedt | |
| 4,590,425 A | 5/1986 | Schonstedt | |
| 4,639,674 A | 1/1987 | Rippingale | |
| 4,712,094 A | 12/1987 | Bolson, Sr. | |
| 4,747,207 A | 5/1988 | Schonstedt et al. | |
| 4,803,773 A | 2/1989 | Schonstedt | |
| 4,818,944 A | 4/1989 | Rippingale | |
| 4,839,623 A | 6/1989 | Schonstedt et al. | |

(Continued)

FOREIGN PATENT DOCUMENTS

EP 1852365 A1 11/2007

(Continued)

OTHER PUBLICATIONS

G. Fox et al., *GPS Provides Quick, Accurate Data for Underground Utility Location* (as featured in Apr. 2002 issue of Trenchless Technology, http://www.woolpert.com/asp/articles/GPS-Provides.asp, Sep. 14, 2007, pp. 1 and 2.

(Continued)

*Primary Examiner*—Mark Hellner
(74) *Attorney, Agent, or Firm*—Wolf, Greenfield & Sacks, P.C.

(57) ABSTRACT

A system may dispense a marker, determine location data or time data, and substantially simultaneously trigger the dispensing of the marker and logging of the location data that identifies a geographic location at which the marker is dispensed or the time data that identifies a time at which the marker is dispensed.

49 Claims, 3 Drawing Sheets

U.S. PATENT DOCUMENTS

| | | | |
|---|---|---|---|
| 4,839,624 A | 6/1989 | Schonstedt |
| 4,873,533 A | 10/1989 | Oike |
| 5,001,430 A | 3/1991 | Peterman et al. |
| 5,006,806 A | 4/1991 | Rippingale et al. |
| 5,014,008 A | 5/1991 | Flowerdew |
| 5,017,873 A | 5/1991 | Rippingale et al. |
| 5,043,666 A | 8/1991 | Tavernetti et al. |
| 5,045,368 A | 9/1991 | Cosman et al. |
| 5,065,098 A | 11/1991 | Salsman et al. |
| 5,093,622 A | 3/1992 | Balkman |
| 5,097,211 A | 3/1992 | Schonstedt |
| 5,114,517 A | 5/1992 | Rippingale et al. |
| 5,122,750 A | 6/1992 | Rippingale et al. |
| 5,136,245 A | 8/1992 | Schonstedt |
| 5,138,761 A | 8/1992 | Schonstedt |
| 5,173,139 A | 12/1992 | Rippingale et al. |
| 5,206,065 A | 4/1993 | Rippingale et al. |
| 5,214,757 A | 5/1993 | Mauney et al. |
| 5,231,355 A | 7/1993 | Rider et al. |
| 5,239,290 A | 8/1993 | Schonstedt |
| 5,260,659 A | 11/1993 | Flowerdew et al. |
| 5,264,795 A | 11/1993 | Rider |
| 5,361,029 A | 11/1994 | Rider et al. |
| 5,365,163 A | 11/1994 | Satterwhite et al. |
| 5,373,298 A | 12/1994 | Karouby |
| 5,430,379 A | 7/1995 | Parkinson et al. |
| 5,444,364 A | 8/1995 | Satterwhite et al. |
| 5,471,143 A | 11/1995 | Doany |
| 5,519,329 A | 5/1996 | Satterwhite |
| 5,530,357 A | 6/1996 | Cosman et al. |
| 5,543,931 A * | 8/1996 | Lee et al. | 386/68 |
| 5,576,973 A * | 11/1996 | Haddy | 342/357.06 |
| 5,621,325 A | 4/1997 | Draper et al. |
| 5,629,626 A * | 5/1997 | Russell et al. | 324/345 |
| 5,644,237 A | 7/1997 | Eslambolchi et al. |
| 5,739,785 A | 4/1998 | Allison et al. |
| 5,751,289 A | 5/1998 | Myers |
| 5,764,127 A | 6/1998 | Hore et al. |
| 5,769,370 A | 6/1998 | Ashjaee |
| 5,828,219 A | 10/1998 | Hanlon et al. |
| 5,916,300 A | 6/1999 | Kirk et al. |
| 5,917,325 A | 6/1999 | Smith |
| 5,920,194 A | 7/1999 | Lewis et al. |
| 5,955,667 A | 9/1999 | Fyfe |
| 6,031,454 A | 2/2000 | Lovejoy et al. |
| 6,032,530 A | 3/2000 | Hock |
| 6,061,632 A | 5/2000 | Dreier |
| 6,074,693 A | 6/2000 | Manning |
| 6,107,801 A | 8/2000 | Hopwood et al. |
| 6,127,827 A | 10/2000 | Lewis |
| 6,130,539 A | 10/2000 | Polak |
| 6,140,819 A | 10/2000 | Peterman et al. |
| 6,169,958 B1 | 1/2001 | Nagasamy et al. |
| 6,188,777 B1 | 2/2001 | Darrell et al. |
| 6,206,282 B1 | 3/2001 | Hayes, Sr. et al. |
| 6,234,218 B1 | 5/2001 | Boers |
| 6,268,731 B1 | 7/2001 | Hopwood et al. |
| 6,297,736 B1 | 10/2001 | Lewis et al. |
| 6,299,934 B1 | 10/2001 | Manning |
| 6,308,565 B1 | 10/2001 | French et al. |
| 6,356,082 B1 | 3/2002 | Alkire et al. |
| 6,363,320 B1 | 3/2002 | Chou |
| 6,375,038 B1 | 4/2002 | Daansen et al. |
| 6,378,220 B1 | 4/2002 | Baioff et al. |
| 6,390,336 B1 | 5/2002 | Orozco |
| 6,407,550 B1 | 6/2002 | Parakulam et al. |
| 6,411,094 B1 | 6/2002 | Gard et al. |
| 6,437,708 B1 * | 8/2002 | Brouwer | 340/988 |
| 6,459,266 B1 | 10/2002 | Fling |
| 6,476,708 B1 | 11/2002 | Johnson |
| 6,490,524 B1 | 12/2002 | White et al. |
| 6,549,011 B2 | 4/2003 | Flatt |
| 6,552,548 B1 | 4/2003 | Lewis et al. |
| 6,585,133 B1 | 7/2003 | Brouwer |
| 6,600,420 B2 | 7/2003 | Goff et al. |
| 6,617,856 B1 | 9/2003 | Royle et al. |
| 6,633,163 B2 | 10/2003 | Fling |
| 6,650,798 B2 | 11/2003 | Russell et al. |
| 6,674,276 B2 | 1/2004 | Morgan et al. |
| 6,710,741 B2 | 3/2004 | Tucker |
| 6,717,392 B2 | 4/2004 | Pearson |
| 6,723,375 B2 | 4/2004 | Zeck et al. |
| 6,728,662 B2 | 4/2004 | Frost et al. |
| 6,751,554 B1 | 6/2004 | Asher et al. |
| 6,777,923 B2 | 8/2004 | Pearson |
| 6,778,128 B2 | 8/2004 | Tucker et al. |
| 6,798,379 B2 | 9/2004 | Tucker et al. |
| 6,799,116 B2 | 9/2004 | Robbins |
| 6,815,953 B1 | 11/2004 | Bigelow |
| 6,819,109 B2 | 11/2004 | Sowers et al. |
| 6,825,775 B2 | 11/2004 | Fling et al. |
| 6,825,793 B2 | 11/2004 | Taylor, Jr. et al. |
| 6,833,811 B2 | 12/2004 | Zeitfuss et al. |
| 6,836,231 B2 | 12/2004 | Pearson |
| 6,845,171 B2 | 1/2005 | Shum et al. |
| 6,850,161 B1 | 2/2005 | Elliott et al. |
| 6,850,843 B2 | 2/2005 | Smith et al. |
| 6,853,303 B2 | 2/2005 | Chen et al. |
| 6,865,484 B2 | 3/2005 | Miyasaka et al. |
| 6,898,550 B1 | 5/2005 | Blackadar et al. |
| 6,904,361 B1 | 6/2005 | Tallman et al. |
| 6,954,071 B2 | 10/2005 | Flatt et al. |
| 6,956,524 B2 | 10/2005 | Tucker et al. |
| 6,958,690 B1 | 10/2005 | Asher et al. |
| 6,968,296 B2 | 11/2005 | Royle |
| 6,975,942 B2 | 12/2005 | Young et al. |
| 6,977,508 B2 | 12/2005 | Pearson et al. |
| 6,992,584 B2 | 1/2006 | Dooley et al. |
| 6,993,088 B2 | 1/2006 | Fling et al. |
| 7,009,519 B2 | 3/2006 | Leonard et al. |
| 7,038,454 B2 | 5/2006 | Gard et al. |
| 7,042,358 B2 | 5/2006 | Moore |
| 7,053,789 B2 | 5/2006 | Fling et al. |
| 7,057,383 B2 | 6/2006 | Schlapp et al. |
| 7,062,414 B2 | 6/2006 | Waite et al. |
| 7,079,591 B2 | 7/2006 | Fling et al. |
| 7,091,872 B1 | 8/2006 | Bigelow et al. |
| 7,113,124 B2 | 9/2006 | Waite |
| 7,116,244 B2 | 10/2006 | Fling et al. |
| 7,120,564 B2 | 10/2006 | Pacey |
| 7,235,980 B2 | 6/2007 | Pearson et al. |
| 7,285,958 B2 | 10/2007 | Overby et al. |
| 7,304,480 B1 | 12/2007 | Pearson |
| 7,310,584 B2 | 12/2007 | Royle |
| 7,319,387 B2 * | 1/2008 | Willson et al. | 340/539.13 |
| 7,331,340 B2 | 2/2008 | Barney |
| 7,336,078 B1 | 2/2008 | Merewether et al. |
| 7,339,379 B2 | 3/2008 | Thompson et al. |
| 7,342,537 B2 | 3/2008 | Pearson et al. |
| 7,356,421 B2 | 4/2008 | Gudmundsson et al. |
| 7,358,738 B2 | 4/2008 | Overby et al. |
| 7,372,247 B1 * | 5/2008 | Giusti et al. | 324/67 |
| 7,372,276 B2 | 5/2008 | Mulcahey |
| 7,396,177 B2 | 7/2008 | Lapstun et al. |
| 7,396,178 B2 | 7/2008 | Lapstun et al. |
| 7,403,012 B2 | 7/2008 | Worsley et al. |
| 7,413,363 B2 | 8/2008 | Lapstun et al. |
| 7,482,973 B2 | 1/2009 | Tucker et al. |
| 7,500,583 B1 * | 3/2009 | Cox | 222/402.1 |
| 2002/0130806 A1 * | 9/2002 | Taylor et al. | 342/22 |
| 2003/0184300 A1 | 10/2003 | Bigelow |
| 2003/0196585 A1 | 10/2003 | McDonald et al. |
| 2004/0057795 A1 | 3/2004 | Mayfield et al. |
| 2004/0168358 A1 | 9/2004 | Stump |

| | | |
|---|---|---|
| 2004/0220731 A1 | 11/2004 | Tucker et al. |
| 2005/0040222 A1 | 2/2005 | Robinson |
| 2005/0055142 A1* | 3/2005 | McMurtry et al. ............ 701/29 |
| 2005/0192727 A1 | 9/2005 | Shostak et al. |
| 2006/0026020 A1 | 2/2006 | Waite et al. |
| 2006/0055584 A1 | 3/2006 | Waite et al. |
| 2006/0077095 A1 | 4/2006 | Tucker et al. |
| 2006/0109131 A1 | 5/2006 | Sen et al. |
| 2006/0244454 A1 | 11/2006 | Gard et al. |
| 2006/0254820 A1 | 11/2006 | Cole et al. |
| 2006/0276198 A1 | 12/2006 | Michelon et al. |
| 2006/0282280 A1 | 12/2006 | Stotz et al. |
| 2006/0285913 A1 | 12/2006 | Koptis |
| 2006/0287900 A1 | 12/2006 | Fiore et al. |
| 2006/0289679 A1 | 12/2006 | Johnson et al. |
| 2007/0013379 A1 | 1/2007 | Staples et al. |
| 2007/0018632 A1 | 1/2007 | Royle |
| 2007/0100496 A1* | 5/2007 | Forell ......................... 700/245 |
| 2007/0219722 A1 | 9/2007 | Sawyer et al. |
| 2007/0288195 A1 | 12/2007 | Waite et al. |
| 2008/0125942 A1 | 5/2008 | Tucker et al. |
| 2008/0245299 A1 | 10/2008 | Nielsen et al. |
| 2009/0013928 A1 | 1/2009 | Nielsen et al. |
| 2009/0085568 A1 | 4/2009 | Cole |
| 2009/0121933 A1 | 5/2009 | Tucker et al. |

FOREIGN PATENT DOCUMENTS

| | | |
|---|---|---|
| WO | WO-9112119 | 6/1991 |
| WO | WO-9424584 A1 | 10/1994 |
| WO | WO-9629572 | 9/1996 |
| WO | WO-9854600 A1 | 12/1998 |
| WO | WO-9854601 A1 | 12/1998 |
| WO | WO-9900679 A1 | 1/1999 |
| WO | WO-2004100044 A1 | 11/2004 |
| WO | WO-2004102242 A1 | 11/2004 |
| WO | WO-2005052627 A2 | 6/2005 |
| WO | WO-2006015310 A3 | 2/2006 |
| WO | WO-2006136776 A1 | 12/2006 |
| WO | WO-2006136777 A1 | 12/2006 |
| WO | WO-2007067898 A2 | 6/2007 |

OTHER PUBLICATIONS

Trimble Navigation Limited, *H-Star Technology Explained*, www.trimble.com, pp. 1-9, 2005.

Bridget Carey "Tracking Shoes"; Chicago Tribune Online Edition, Jan. 29, 2007; pp. 1-3; http://www.chicagotribune.com/services/site/premium/access-registered.intercept.

Bearden, T., "New Identification Technology Raises Concerns over Privacy," PBS Online NewsHour Report, Aug. 17, 2006, pp. 1-5, http://www.pbs.org/newshour/bb/science/july-dec06/rfid_08-17.html.

* cited by examiner

MARKING SYSTEM AND METHOD WITH LOCATION AND/OR TIME TRACKING

BACKGROUND

Underground man-made objects, such as utility lines and pipes (hereinafter "utility lines"), are very susceptible to damage from excavation activities. Local and federal regulations require that notification be given to owners of underground utility lines in an area to be excavated before any excavation takes place. The owners of the utility lines typically must locate and mark the location of any underground utility lines.

The tasks of locating and marking underground utility lines can be performed by either the utility line owner or by third party contractors. A marking tool is typically used to mark the ground, pavement or other surfaces in order to provide a visual indication of the location of underground utilities. Paint is commonly used as the marker, and it is typically applied using a paint marking tool. The color of the paint is typically chosen based on the type of utility line being marked (e.g., red for an electrical line).

Inaccurate marking of the utility lines can result in physical damage to utility lines, property damage, and/or personal injury during the excavation process that, in turn, can expose the utility line owner or contractor to significant legal liability. When utility lines are damaged and/or when property damage or personal injury results from hitting a utility line during an excavation, the excavator may assert that the utility line was not accurately marked by the entity that carried out the marking, while the entity that marked the utility line will assert that the utility line was properly marked. Proving whether the utility line was properly marked can be difficult after the excavation, because in many cases the paint line used to mark the utility line will have been disturbed or destroyed during the excavation process.

SUMMARY

According to one aspect, a marking system may include a marker dispenser to hold and dispense markers; a location tracking system to determine location data; a processor; and a triggering system in communication with the marker dispenser and the processor to substantially simultaneously trigger the marker dispenser to dispense a marker and the processor to log the location data to identify a geographic location of the marker.

According to another aspect, a marking tool may include a housing; a marker dispenser mounted to the housing to hold and dispense markers; a location tracking system mounted to, connected to, or located within the housing to determine location data; and a triggering system mounted to, connected to, or located within the housing to substantially simultaneously trigger the marker dispenser to dispense a marker and logging of the location data from the location tracking system to identify a geographic location of the marker.

According to yet another aspect, a method may include dispensing a marker in an area to be marked, and logging at least one of location data identifying a geographic location of where the marker is dispensed or time data identifying a time at which the marker is dispensed while the marker is dispensed.

According to a further aspect, a marking tool may include means for dispensing a marker; means for determining location data or time data; and means for substantially simultaneously triggering the dispensing of the marker and logging of the location data that identifies a geographic location at which the marker is dispensed or the time data that identifies a time at which the marker is dispensed.

According to another aspect, a marking tool may include a marker dispenser to hold and dispense markers; a timing system to output time data; a processor; and a triggering system to substantially simultaneously trigger the marker dispenser to dispense a marker and the processor to log the time data to identify a time at which the marker is dispensed.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Figure 1:
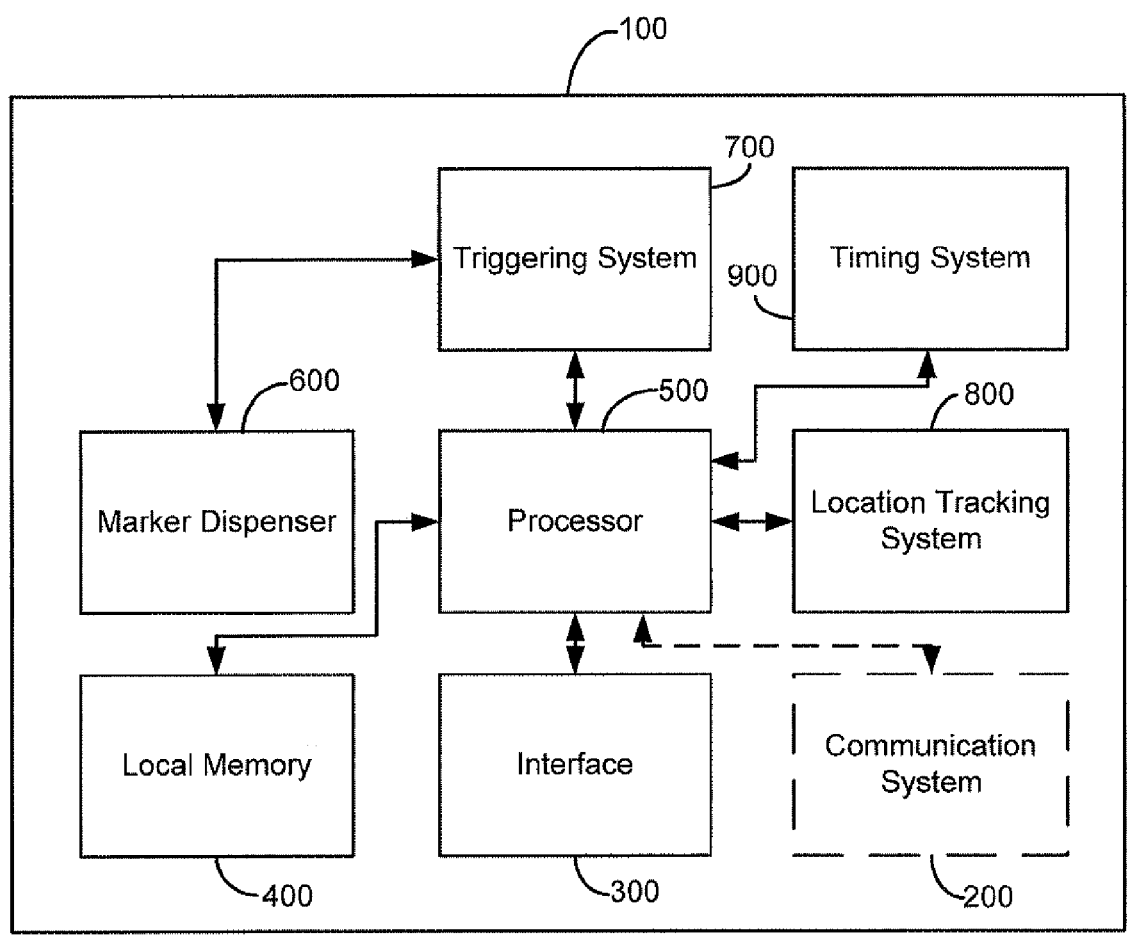
FIG. 1 is block diagram of a marking system with location and/or time tracking.

FIG. 1 is block diagram of a marking system 100 with location and/or time tracking. The system 100 may include an optional communication system 200, interface 300, local memory 400, processor 500, marker dispenser 600, triggering system 700, location tracking system 800, and timing system 900. In other implementations, system 100 may include fewer, different, or additional elements.

In one implementation, the system 100 may be used to accurately record the geographic location where markers are dispensed using data from the location tracking system 800 and/or the time at which the markers are dispensed using data from the timing system 900. In one exemplary application of the system 100, the location of markers used to mark underground utility lines and/or the time at which the markers are dispensed can be accurately and reliably recorded. The marker that is used to mark underground utility lines may include a liquid, such as paint. However, other types of markers, such as objects (e.g., flags, stakes, etc.), may be used in other implementations.

The location tracking system 800 may include any device that can determine its geographic location to a certain degree of accuracy, such as a global positioning system (GPS) or a global navigation satellite system (GNSS) receiver. In another implementation, the location tracking system 800 can include a device that determines location using another technique, such as tower (e.g., cellular tower) triangularization.

The location tracking system 800 may receive location tracking signals (e.g., GPS signals) and determine its location based on these signals. In one implementation, the location tracking system 800 may be capable of determining its location within less than approximately thirty centimeters.

The timing system 900 may include any device that can output time data to some level of accuracy (e.g., accuracy to the minute, the second, the millisecond, etc.). In one implementation, the timing system 900 may be capable of generating the time data itself. In this situation, the timing system 900 may take the form of a clock. In another implementation, the timing system 900 may receive the time data from another timing system. In this situation, the timing system 900 may take the form of a receiver. In some situations, it may be beneficial for the timing system 900 to be synchronized to another timing system.

A user can control the operation of the system 100 via interface 300. In one implementation, interface 300 may include a touch screen interface that can provide various operational controls and status indicators of the system 100, and can allow the user to navigate the controls by touching particular areas of the screen. In another implementation, interface 300 may include another form of input and/or output, such as, for example, a display for displaying information and a keypad for entering information.

The triggering system 700 may trigger the logging of location and/or time data and the dispensing of markers. In one implementation, the system 100 may log location and/or time data only when a marker is being dispensed by the marker dispenser 600. This may be accomplished via a triggering mechanism that, when actuated by the user, triggers both the marker dispenser 600 and the logging of location and/or time data. The location data may be received from the location tracking system 800, and logged and stored in local memory 400 by the processor 500. The time data may be received from the timing system 900, and logged and stored in local memory 400 by the processor 500.

The marker dispenser 600 may hold the markers and may also contain an actuation mechanism (not shown in FIG. 1) that causes the markers to be dispensed. As described above, the markers dispensed by the marker dispenser 600 may include a liquid (e.g., paint) or an object (e.g., flags or stakes). Details of the marker dispenser 600 will be discussed in more detail below.

In operation, a user may engage a triggering mechanism in the triggering system 700 (explained in more detail below) in order to dispense the markers. When the triggering mechanism is engaged, the triggering system 700 may also initiate logging of location data received from the location tracking system 800 and/or time data received from the timing system 900. This may be done by sending a signal to the processor 500, which may cause processor 500 to store a log of the location and/or time data in local memory 400.

Communication system 200 may include an interface for transmitting data to and/or receiving data from one or more external devices and/or systems located either local to or remote from the system 100. Communication system 200 may include any type of interface, such as an interface for communicating via Ethernet, Bluetooth, Wifi, radio frequency (RF), a wide area network (WAN), or another type of network or protocol.

In one implementation, communication system 200 may send location and/or time data logs stored in local memory 400 to an external device/system and/or receive information from an external device/system. The location data logs may be used by the external device/system to accurately track the location where the markers were dispensed. The time data logs may be used by the external device/system to accurately track a time at which the markers were dispensed.

System 100, as broadly described herein, may be particularly suited for incorporation into marking tools for marking underground utilities. As discussed above, a marking tool is used to mark the ground, pavement or other surfaces in order to provide a visual indication of the location of underground utilities. The type of marker that may be used includes paint that may be supplied in aerosol cans that are oriented axially with respect to the long axis of the aerosol cans. The marking tool enables a user to walk or stand erect while dispensing the markers.

Figure 2:
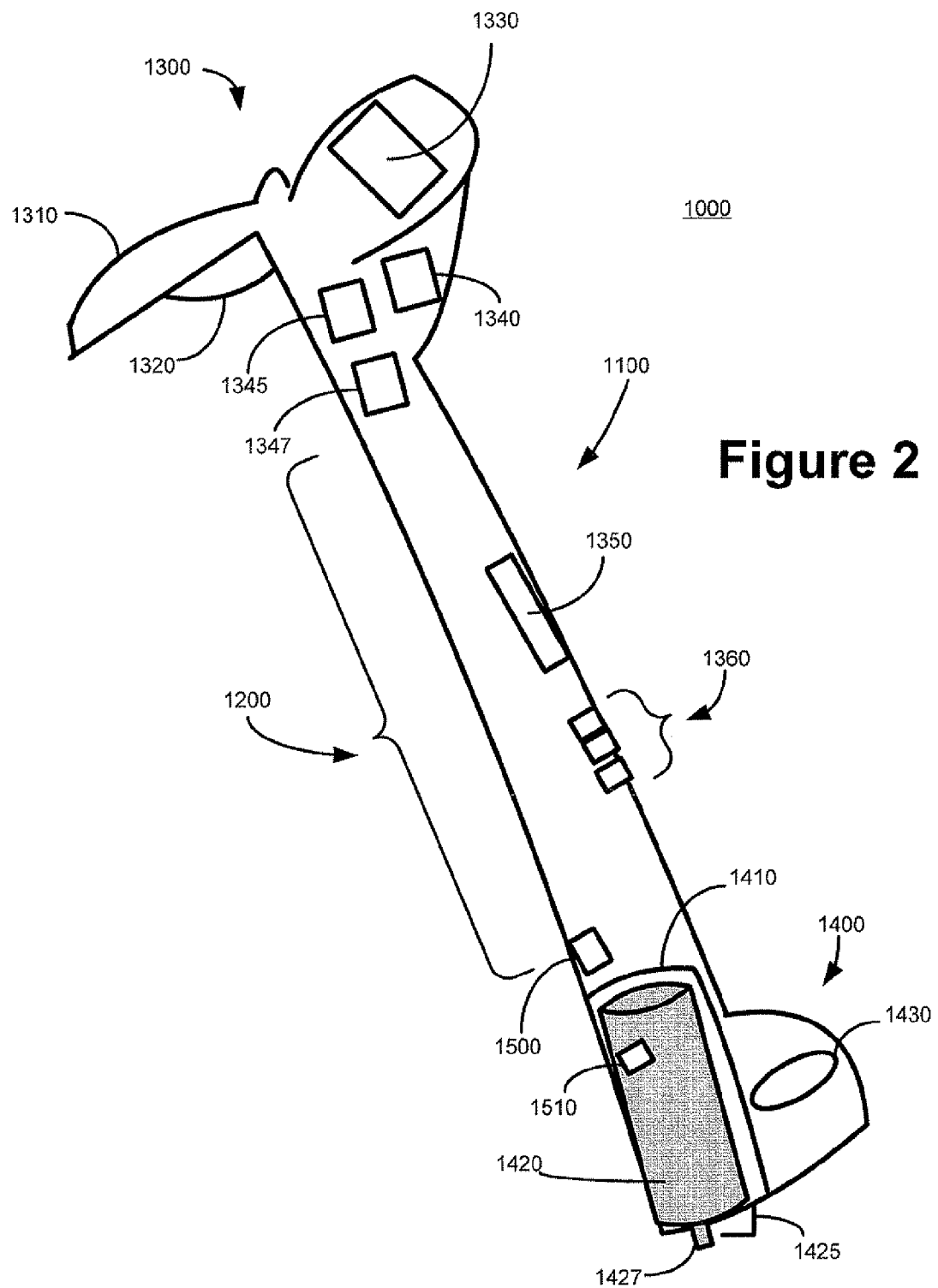
FIG. 2 is a schematic diagram of a marking tool with location and/or time tracking.

FIG. 2 is a schematic diagram of a marking tool 1000 with location and/or time tracking. For the description to follow, assume that the marking tool 1000 uses paint as the marker. However, it should be appreciated that any other marker, such as another type of liquid, flags, stakes, etc., may be used in other implementations.

The marking tool 1000 may include a housing 1100 with an elongated center housing portion 1200, a top housing portion 1300 and a bottom housing portion 1400. The housing 1100 may be formed of any at least semi-rigid material, and may be formed of a lightweight material such as aluminum or plastic.

A paint canister holder 1410 may be attached to the bottom housing portion 1400. The paint canister holder 1410 may include an open-ended tubular structure that is attached to the bottom housing portion 1400 by any suitable attachment mechanisms, such as rivets, adhesive, mechanical fasteners or the like. The paint canister holder 1410 may be formed of any material such as injection-molded plastic, formed sheet metal or any other appropriate material that may be fabricated into an open tubular configuration or any other configuration that will serve to support a paint canister 1420 with the paint canister axis substantially parallel to the housing 1100.

The housing 1100 may optionally include a tag (e.g., radio frequency identification (RFID)) reader 1500 that may read tags (e.g., RFID tags). The tag reader 1500 may include an antenna (not shown) that emits radio waves and the tag may respond by sending back its data. A tag 1510 can be attached to the paint canister 1420 and can incorporate data, readable by the tag reader 1500, that corresponds to characteristics of the paint (e.g., paint color). Other examples of marker characteristics may include, but are not limited to, the type of marker. The data read by the tag reader 1500 can then be sent to a processor 1340 for a determination of the corresponding characteristic. The corresponding characteristic can then displayed by a display 1330, logged, and/or sent to an external device or system for processing. The tag reader 1500 may be mounted anywhere on the housing or on the paint canister 1410. However, the tag reader 1500 does not have to be mounted anywhere on the marker tool itself. For example, the tag reader 1500 may be carried by a user. In general, the tag reader 1500 may be mounted or located at any location, as long as it can receive data transmitted from the tag 1510.

An actuation mechanism 1425 may be attached to the bottom housing portion 1400 at a location from which it can actuate the nozzle 1427 of the paint canister 1420. The actuation mechanism 1425 may include a rigid material that depresses the nozzle 1427 when actuated. However, any mechanism may be used to actuate the nozzle 1427 of the paint canister 1420.

A handle 1310 may be provided at the top housing portion 1300. The handle 1310 may be formed of injection-molded plastic or any other appropriate material, and may be attached to the top housing portion 1300 by rivets, adhesive, or any other suitable means. A mechanical trigger 1320 may be provided on the top housing portion 1300. The mechanical trigger 1320 may be located on the handle 1310 and attached using any suitable means.

The display 1330 may be provided on the top housing portion 1300. The display 1330 may include a touch-screen display for displaying information to a user, as well as acting as an input device. The processor 1340 and a local memory 1345 are located in the housing 1100. In one implementation, the processor 1340 and local memory 1345 may be located in the top housing portion 1300 so as to be in close proximity to the display 1330 and mechanical trigger 1320. In another implementation, the processor 1340 and local memory 1345 may be located elsewhere within the housing 1100.

The timer 1347 may be provided on the top housing portion 1300. Alternatively, the timer 1347 may be located elsewhere within housing 1100. The timer 1347 may output time data to the processor 1340.

A wireless communication antenna 1350 may be located on the housing 1100, and used to transmit data, such as location and/or time data logs stored in local memory 1345, to an external device/system and/or to receive information from an external device/system.

A location tracking system receiver 1430 for receiving location tracking signals (e.g., GPS signals) may be mounted inside the housing 1100. In the embodiment of FIG. 2, the location tracking system receiver 1430 may be located at the bottom housing portion 1400. In another embodiment, the location tracking system receiver 1430 may be located elsewhere within or on the housing 1100 at a location that optimizes signal reception. However, the location tracking system receiver 1430 does not have to be mounted anywhere on the marker tool itself. For example, the location tracking system receiver 1430 may be carried by a user. In general, the location tracking system receiver 1430 may be mounted or located at any location, as long as it can receive the location tracking signals.

The tool 1000 may also optionally include one or more input/output ports 1360, such as USB, SCSI, Firewire, Ethernet and/or other ports, for interfacing with other equipment and/or computers.

In operation, a user may operate the paint marking tool 1000 while standing or walking in an upright manner. A user may control the operation of the tool 1000 via display 1330, mechanical trigger 1320, and/or a wireless interface that may be provided via wireless communication antenna 1350 and/or input/output ports 1360.

The various operational controls and status indicators of the tool 1000 are displayed on display 1330, and the user can also navigate the controls by touching particular areas of the display 1330. Although a touch-screen display is one form of the display 1330, any other type of display or interface may be used such as, for example, a display for displaying information and a keypad for entering information. The user may use the display 1330 to substantially simultaneously trigger the logging of the location and/or time data, and the dispensing of paint.

The mechanical trigger 1320 may trigger the logging of the location data (e.g., GPS coordinate) and/or the time data, and the dispensing of paint. In one implementation, the tool 1000 may log the location and/or time data only when paint is being dispensed. This may be accomplished by utilizing a mechanical trigger 1320 that, when actuated by the user, substantially simultaneously triggers both the actuation mechanism 1425 for the paint canister 1420 and the logging of the location and/or time data by the processor 1340. The processor 1340 may receive the location data from the location tracking system receiver 1430, the time data from the timer 1347, and store the location and/or time data in local memory 1345.

The mechanical trigger 1320 can trigger the actuation mechanism 1425 via a mechanical connection between the trigger 1320 and the actuation mechanism 1425. For example, the actuation mechanism 1425 can be a rigid material that is connected to the mechanical trigger 1320 via a mechanical linkage (not shown), in which case depressing the mechanical trigger 1320 may cause the actuation mechanism to apply pressure to the nozzle 1427 of the paint canister 1420. However, the mechanical trigger 1320 may also, or alternatively, trigger the actuation mechanism 1425 via an electronic connection. The electronic connection may be a hardwired connection or a wireless connection. If the connection between the mechanical trigger 1320 and the actuation mechanism 1425 is an electronic connection, the actuation mechanism 1425 may include a mechanism for generating the force necessary to depress the nozzle 1427 of the paint canister 1420.

The wireless interface may be capable of capturing signals that reflect a user's intent. For example, the wireless interface may include a microphone that can capture a user's intent by capturing the user's audible commands. Alternatively, the wireless interface may interact with a device that monitors a condition of the user, such as eye movement, brain activity, or heart rate. In either event, the wireless interface may generate signals that may be sent to the processor 1340 for processing. The processor 1340 may use the signals to substantially simultaneously trigger the logging of the location and/or time data, and the dispensing of paint.

Figure 3:
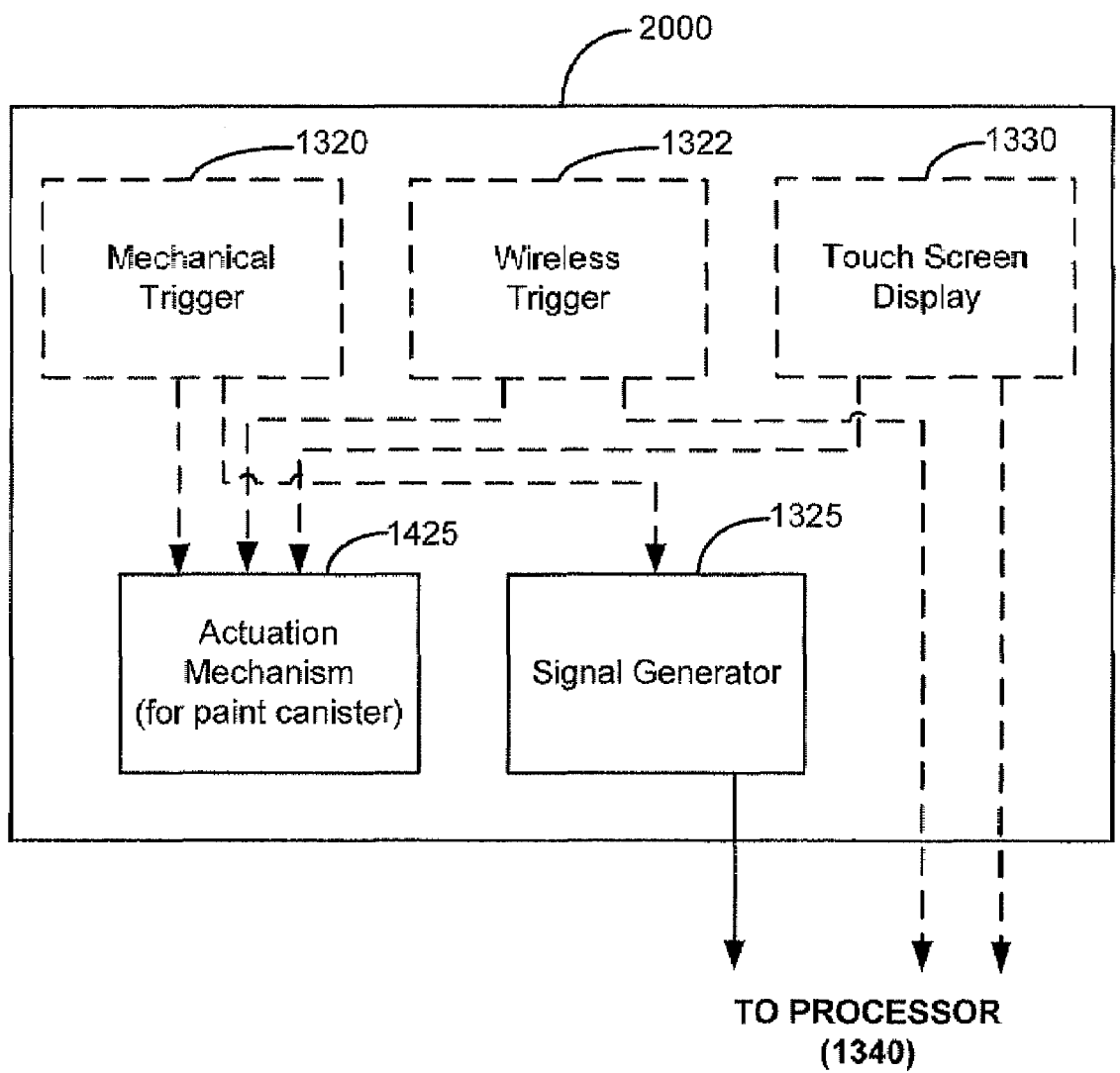
FIG. 3 is a schematic diagram of a triggering system used in the marking tool of FIG. 2.

FIG. 3 is a diagram of one embodiment of a triggering system 2000 used in the marking tool 1000 of FIG. 2. As shown in FIG. 3, the triggering system 2000 may include the mechanical trigger 1320, a wireless trigger 1322, and/or a touch screen display 1330, the mechanical actuation device 1425, and a signal generator 1325.

In operation, a user may substantially simultaneously trigger the logging of location and/or time data and the dispensing of paint by actuating the mechanical trigger 1320. The logging of location and/or time data and the dispensing of paint may also, or alternatively, be triggered by a trigger signal from wireless trigger 1322 or by choosing a command that is displayed on the touch screen display 1330. It should be appreciated that triggering system 2000 may include a mechanical trigger 1320, a trigger signal from wireless trigger 1322, a trigger command on a touch screen display 1330 or a combination of a mechanical trigger 1320, a trigger signal from wireless trigger 1322, and/or a trigger command on a touch screen display 1330 for initiating the logging of location and/or time data and the dispensing of paint.

When a user actuates the mechanical trigger 1320, the mechanical actuation device 1425 and the signal generator 1325 are both activated. The mechanical actuation device 1420 actuates the nozzle 1427 of the paint canister 1420, thus dispensing paint out of the paint canister 1420. The signal generator 1325, when activated, sends a start log signal to the processor 1340 for triggering the logging of location and/or time data. For example, the start log signal may instruct the processor 1340 to read, or otherwise obtain, location data from location tracking system 800 (FIG. 1) or the location tracking system receiver 1430 (FIG. 2), and store the location data in local memory 400 (FIG. 1) or 1345 (FIG. 2). In addition, or alternatively, the start log signal may instruct the processor 1340 to read, or otherwise obtain, time data from timing system 900 (FIG. 1) or the timer 1347 (FIG. 2), and store the time data in local memory 400 (FIG. 1) or 1345 (FIG. 2).

The mechanical trigger 1320 can activate the mechanical actuation device 1420 via a mechanical connection, e.g., a mechanical linkage, between the mechanical trigger 1320 and the mechanical actuation device 1425. Alternatively, the mechanical trigger 1320 can activate the mechanical actuation device 1420 via a wired or wireless electronic connection between the mechanical trigger 1320 and the mechanical actuation device 1425.

If a trigger signal from wireless trigger 1322 is used by the user to initiate location and/or time data logging and paint dispersal, the wireless trigger 1322 may send a signal to both the mechanical actuation device 1425 and the processor 1340. The signal sent to the mechanical actuation device 1425 by the wireless trigger 1322 may result in the actuation of the nozzle 1427 of the paint canister 1420 by the mechanical actuation device 1425. The signal sent to the processor 1340 by the wireless trigger 1322 may trigger the logging of the location and/or time data. The signals sent by the wireless trigger 1322 to the mechanical actuation device 1425 and the processor 1340 may be sent via a wired or wireless connection.

If a command on the touch screen display 1330 is used by the user to initiate location and/or time data logging and paint dispersal, the touch screen 1330 sends a signal to both the mechanical actuation device 1425 and the processor 1340. The signal sent to the mechanical actuation device 1425 by the touch screen display 1330 may result in the actuation of the nozzle 1427 of the paint canister 1420 by the mechanical actuation device 1425. The signal sent to the processor 1340 by the touch screen display 1330 may trigger the logging of the location and/or time data. The signals sent by the touch screen display 1330 to the mechanical actuation device 1425 and the processor 1340 may be sent via a wired or wireless connection.

The logged location and/or time data may be used by an external device and/or system to track the dispensing of markers with a high degree of accuracy. The logged location and/or time data may be useful when disputes arise regarding whether the dispensed markers were placed in the correct location. Also, the logged data may be used to visually depict (e.g., in real time as the dispensing occurs) or reconstruct (e.g., at a later time after the dispensing is complete) the dispensing of the markers on an electronic representation of the area that is currently being marked or was previously marked.

The processors 500 and 1340 can be general purpose computers. Alternatively, they can also be special purpose computers, programmed microprocessors or microcontrollers and peripheral integrated circuit elements, ASICs or other integrated circuits, hardwired electronic or logic circuits such as discrete element circuits, programmable logic devices such as FPGA, PLD, PLA or PAL or the like. In general, any device capable of executing code can be used to implement processors 500 and 1340. Local memories 400 and 1345 can be implemented with any type of electronic memory and/or storage device using any type of media, such as magnetic, optical or other media.

The foregoing description is not intended to be exhaustive or to limit the description to the precise form disclosed. Modifications and variations are possible in light of the above disclosure or may be acquired from practice of the invention.

It will be apparent that aspects, as described above, may be implemented in many different forms of software, firmware, and hardware in the implementations illustrated in the figures. The actual software code or specialized control hardware used to implement these aspects is not limiting of the description provided herein. Thus, the operation and behavior of the aspects were described without reference to the specific software code—it being understood that software and control hardware can be designed to implement the aspects based on the description herein.

The term "substantially simultaneously," as used herein, is intended to mean simultaneously or approximately simultaneously. No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A marking system to mark ground, pavement or other surfaces to provide a visual indication of a presence or an absence of at least one underground utility in a dig area to be excavated or disturbed during excavation activities, the marking system comprising:
    a housing including an elongated center portion and a handle to enable a user to walk or stand erect in the dig area while using the marking system;
    a paint canister holder disposed in a bottom portion of the housing and adapted to support an aerosol paint canister having a nozzle;
    an actuation mechanism coupled to the bottom portion of the housing and comprising a rigid material that controllably applies pressure to the nozzle of the aerosol paint canister, when the canister is installed in the paint canister holder, to dispense paint from the paint canister;
    a location tracking system at least a portion of which is disposed within or coupled to the housing to determine location data;
    a processor disposed within the housing;
    a memory disposed within the housing; and
    a triggering system in communication with the actuation mechanism and the processor to substantially simultaneously trigger the actuation mechanism to apply pressure to the nozzle of the aerosol paint canister to dispense the paint from the canister and the processor to log in the memory the location data to identify a geographic location of the dispensed paint, the triggering system including a mechanical trigger located proximate to the handle of the housing.

2. The system of claim 1, wherein the location tracking system comprises a Global Positioning System device.

3. The system of claim 1, wherein the location tracking system comprises a Global Navigation Satellite System device.

4. The system of claim 1, wherein the location tracking system comprises a ground-based triangularization device.

5. The system of claim 1, further comprising a communication system, coupled to the processor, to transmit the location data logged in the memory to one or more external devices.

6. The system of claim 1, wherein the triggering system comprises:
    a signal generator to send a log start signal to the processor when the mechanical trigger is actuated.

7. The system of claim 6, wherein the signal generator comprises an electronic switch.

8. The system of claim 1, further comprising a display integrated in a top portion of the housing for displaying information to the user and/or receiving input from the user.

9. The system of claim 8, wherein the display includes a touch screen display.

10. The system of claim 6, wherein the triggering system comprises the mechanical trigger and an electronic trigger.

11. The system of claim 1, wherein the location data is accurate to within approximately 30 centimeters.

12. The system of claim 1, further comprising:
    a tag reader to read a tag attached to the aerosol paint canister when the paint canister is installed in the paint canister holder.

13. The system of claim 1, further comprising:
    a timing system disposed within the housing to output time data.

14. The system of claim 13, wherein the triggering system is configured to trigger the actuation mechanism to dispense the paint and the processor to log in the memory the location data from the location tracking system and the time data from the timing system.

15. A marking tool to mark ground, pavement or other surfaces to provide a visual indication of a presence or an absence of at least one underground utility iii a dig area to be excavated or disturbed during excavation activities, the marking tool comprising:
 a housing configured to enable a user to walk or stand erect in the dig area while using the marking system;
 a marker dispenser mounted to, connected to, or located within the housing to hold and dispense at least one marker;
 a processor mounted to, connected to, or located within the housing;
 a memory mounted to, connected to, or located within the housing;
 a location tracking system mounted to, connected to, or located within the housing, and coupled to the processor, to determine location data; and
 a triggering system mounted to, connected to, or located within the housing to substantially simultaneously trigger the marker dispenser to dispense the at least one marker and the processor to log in the memory the location data from the location tracking system to identify a geographic location of the marker.

16. The marking tool of claim 15, wherein the location tracking system comprises a Global Positioning System (GPS) receiver.

17. The marking tool of claim 16, wherein the OPS receiver is mounted on a bottom portion of the housing.

18. The marking tool of claim 15, wherein the location tracking system comprises a Global Navigation Satellite System (GNSS) receiver.

19. The marking tool of claim 18, wherein the GNSS receiver is mounted on a bottom portion of the housing.

20. The marking tool of claim 15, wherein the location tracking system comprises a tower triangularization device.

21. The marking tool of claim 20, wherein the tower triangularization device is mounted on a bottom portion of the housing.

22. The marking tool of claim 15, further comprising a communication system, coupled to the processor, to transmit the location data logged in the memory to one or more external devices.

23. The marking tool of claim 15, wherein the marker dispenser comprises:
 a paint canister holder adapted to support a paint canister; and
 an actuation mechanism to dispense paint from the paint canister when the triggering system triggers the marker dispenser.

24. The marking tool of claim 15, wherein the triggering system comprises:
 a trigger;
 an actuation mechanism to dispense a marker from a marker container when the trigger is actuated; and
 a signal generator to send a log start signal to indicate a start of the logging of the location data when the trigger is actuated.

25. The marking tool of claim 24, wherein the marker container comprises an aerosol canister and the actuation mechanism comprises a rigid material that applies pressure to a nozzle on the aerosol canister when the trigger is actuated.

26. The marking tool of claim 24, wherein the signal generator comprises an electronic switch.

27. The marking tool of claim 24, wherein the trigger comprises a mechanical trigger.

28. The marking tool of claim 24, wherein the trigger comprises an electronic trigger.

29. The marking tool of claim 28, wherein the electronic trigger comprises a touch screen display.

30. The marking tool of claim 28, wherein the electronic trigger comprises a wireless trigger.

31. The marking tool of claim 24, wherein the trigger comprises a mechanical trigger and an electronic trigger.

32. The marking tool of claim 15, further comprising a tag reader mounted on the housing for reading a tag attached to a marker.

33. The marking tool of claim 15, further comprising a user interface mounted to the housing.

34. The marking tool of claim 33, wherein the user interface is mounted to a top portion of the housing.

35. The marking tool of claim 33, wherein the user interface comprises a display.

36. The marking tool of claim 35, wherein the display comprises a touch-screen display.

37. The marking tool of claim 15, wherein the location data is accurate to within approximately 30 centimeters.

38. The marking tool of claim 15, further comprising:
 a timing system to output time data.

39. The marking tool of claim 38, wherein the triggering system is configured to trigger the marker dispenser to dispense the marker and the processor to log the location data from the location tracking system and the time data from the timing system.

40. A method for marking ground, pavement or other surfaces to provide at least one visual indication of a presence or an absence of at least one underground utility in a dig area to be excavated or disturbed during excavation activities, the method comprising:
 A) manually positioning a hand-held marking tool proximate to a geographic location in the dig area at which a marker is to be dispensed;
 B) dispensing the marker from the hand-held marking tool in the dig area;
 C) electronically generating at least one of:
  location data identifying the geographic location of where the marker is dispensed;
  time data identifying a time at which the marker is dispensed; and
  marker data identifying at least one characteristic of the dispensed marker; and
 D) electronically storing the at least one of the location data, the time data, and the marker data so as to generate an electronic record of the at least one visual indication.

41. The method of claim 40, wherein the marker comprises paint.

42. The method of claim 40, wherein the location data comprises GPS coordinates.

43. The method of claim 40, wherein D) comprises electronically storing each of the location data, the time data, and the marker data so as to generate the electronic record of the at least one visual indication.

44. A marking tool to mark ground, pavement or other surfaces to provide a visual indication of a presence or an absence of at least one underground utility in a dig area to be excavated or disturbed during excavation activities, the marking tool comprising:
 an elongated hand-held housing;
 a marking dispenser coupled to the elongated hand-held housing to dispense at least one marker in the dig area;

a triggering system to trigger the marking dispenser so as to dispense the at least one marker; and a communication system including a wireless antenna, coupled to the elongated hand-held housing, to transmit at least one signal from the marking tool relating to at least one actuation of the triggering system by a user.

45. A marking tool to mark ground, pavement or other surfaces to provide a visual indication of a presence or an absence of at least one underground utility in a dig area to be excavated or disturbed during excavation activities, the marking tool comprising:

a housing;

a marker dispenser coupled to the housing to hold and dispense at least one marker in the dig area;

at least one of:
  a timing system to output time data;
  a location tracking system to determine location data; and
  a tag reader to determine marker data;

a processor mounted to, coupled to, or disposed within the housing; and a triggering system communicatively coupled to the processor to substantially simultaneously trigger the marker dispenser to dispense the at least one marker and the processor to log at least one of the time data to identify a time at which the marker is dispensed, the location data to identify a geographic location of the dispensed marker, and the marker data to identify at least one characteristic of the dispensed marker.

46. The marking tool of claim 44, wherein the communication system includes a Bluetooth interface.

47. The marking tool of claim 44, wherein the communication system includes a radio frequency interface.

48. The marking tool of claim 44, wherein the at least one signal transmitted by the wireless antenna relates to at least one of a time of the at least one actuation of the triggering system, a location of the at least one actuation of the triggering system, and at least one characteristic of the dispensed marker.

49. The marking tool of claim 48, further comprising at least one processor, disposed within the housing and coupled to the communication system, to log location and/or time data only when the triggering system is triggering the marking dispenser to dispense the at least one marker, wherein the at least one signal transmitted by the wireless antenna relates to the location and/or time data.

* * * * *

UNITED STATES PATENT AND TRADEMARK OFFICE
CERTIFICATE OF CORRECTION

PATENT NO.        : 7,640,105 B2                                                                                              Page 1 of 1
APPLICATION NO. : 11/685602
DATED             : December 29, 2009
INVENTOR(S)       : Steven E. Nielsen et al.

It is certified that error appears in the above-identified patent and that said Letters Patent is hereby corrected as shown below:

At column 9, claim 15, line 6, "iii" should read -- in --

At column 9, claim 17, line 30, "OPS" should read -- GPS --

Signed and Sealed this

Ninth Day of February, 2010

David J. Kappos
*Director of the United States Patent and Trademark Office*